3,391,283
MEASURING DEVICE HAVING ANALYZER FOR COMPARING PULSES FROM SCALE AND FROM CATHODE RAY TUBE COUPLED TO INTERFEROMETER OUTPUT
Konrad Kuhne, Jena, Germany, assignor to VEB Carl Zeiss Jena, Jena, Gera, Germany
Filed Nov. 9, 1965, Ser. No. 509,679
4 Claims. (Cl. 250—231)

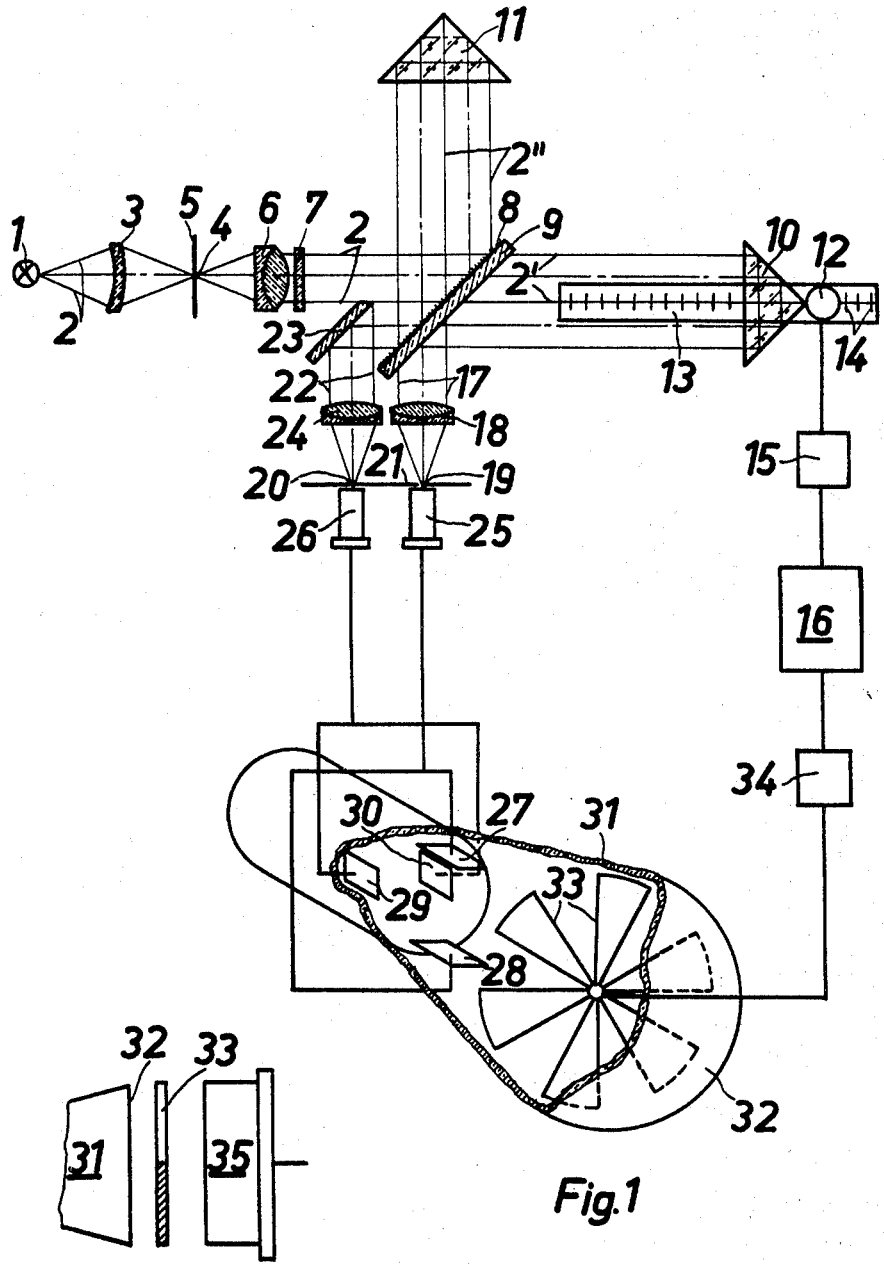

This invention relates to a length-measuring apparatus comprising an interferometer and having at least one displaceable reflector and producing two interference curves of definite phase difference which travel in relation to the reflector displacements, two diaphragms which lie respectively in the image planes of the interference curves and in which different light intensities alternate in dependency on reflector displacement, these intensities producing alternating voltages by means of two photoelectric receivers respectively disposed in the rear of the diaphragms, and a means for producing an electron ray to which these alternating voltages impart rotary motion in space.

In a known apparatus for exact length measurement by means of two interference-strip systems dephased relatively to each other, the light pulses produced by the interference strips are received respectively by two secondary electron multipliers, and the photo-currents produced in these multipliers are conjugate to two pairs of deviating plates, these pairs being at right angles to each other. Accordingly, the electron ray is caused to effect a rotary motion and describes a circle on the screen of the cathode-ray tube, the position of the luminous spot on the screen being a measure for visually checking or estimating fractions of the wave-length of the light. This apparatus suffers from the disadvantage that the coarse and the fine measurement must needs be read at two places, possibly the one objectively and the other subjectively, and that such visual reading of fractions of wave-lengths proves a serious obstacle to an automatization of the method in question.

It is an object of the present invention to provide an apparatus of the foregoing kind for measuring lengths in which the said disadvantages are obviated and length measurement provides well-defined wave-length fractions.

To this end the invention consists in an apparatus for measuring lengths in which the cone described by the motion of the electron ray contains a disc approximately at right angles to the cone axis, this disc having radial slots about a center lying approximately in the cone axis. The disc consists of so many sectors as are required for the exact measurement of fractions of half the wave-length. The apparatus according to the invention permits in a simple manner to adhere to a measuring accuracy of fractions of a wave-length. The duration and intensity of the pulses produced by the disc are highly independent of the brightness and/or contrast changes of the interference curves and of the form described by the rotary motion of the electron ray. Irregularity in the run of the interference reflector is, within wide limits, without any influence on the result of the measurement.

In another embodiment of the apparatus according to the invention the electron ray is produced and controlled by means of a cathode-ray tube containing a slotted disc of electrically conductive material. A further embodiment of the invention, although requiring an additional photoelectric receiver, but permitting any desired subdivision of the wave-length interval by changing the slotted disc, has the slotted disc disposed outside the cathode-ray tube, between the screen of the cathode-ray tube and the photoelectric receiver in the rear of the screen.

The apparatus according to the invention can be used wherever lengths are to be measured, tested and preserved with great accuracy.

In order that the invention may be more readily understood, reference is made to the accompanying drawing which illustrates diagrammatically and by way of example two embodiments thereof and in which FIG. 1 shows the one embodiment, and
FIG. 2 shows part of the other embodiment.

In a Michelson interferometer FIG. 1, a light source 1 emits a beam 2, which by a condenser 3 is centered in the aperture 4 of a diaphragm 5 lying in the focal plane of a collimator objective 6. The parallel ray path in the rear of the objective 6 contains an interference filter 7 for filtering out a definite spectral region, and a semi-transparent beam-dividing plane-parallel plate 9 which is covered by an aluminum layer 8 and divides the beam 2 into two partial beams 2' and 2". The partial beam 2' traverses the plate 8, and the partial beam 2" is reflected by it.

The partial beam 2' strikes a deflecting triple prism 10 containing the displaceable measuring plane, and the partial beam 2" strikes a deflecting triple prism 11 containing the stationary reference plane of the interferometer. The triple prism 10 is fast with a photoelectric microscope 12. As the prism 10 is being displaced, the microscope 12 travels along a scale 13 and, when crossing a division line 14 of the scale 13, receives an electric pulse the intensity of which can be influenced by optical or electronic means (not shown). The pulse is amplified in an amplifier 15 and directed to an analyzer 16. The analyzer 16 may comprise one or more electronic counters, one or more storing devices and a pressure mechanism.

The prisms 10 and 11 reflect the partial beams 2' and 2" parallel to themselves. The beams 2' and 2" so combine with each other in the plane of the aluminium layer 8 that the one part of each of the partial beams 2' and 2" are reflected on this layer 8 and the other part of each of the partial beams 2' and 2" traverse the aluminium layer 8 and the plate 9. The part of the partial beam 2' which is reflected on the aluminium layer 8 and the part of the partial beam 2" which traverses the aluminium layer 8 are superimposed on one another to form a new beam 17. The beam 17 traverses an objective 18 and produces a system of interference curves in the plane of a diaphragm 21 having two slots 19 and 20. Analogously, the part of the partial beam 2' which traverses the aluminium layer 8 and the part of the partial beam 2" which is reflected on this aluminium layer are superimposed on one another to form a new beam 22. The beam 22 is reflected by a mirror 23, traverses an objective 24 and produces a second system of interference curves in the plane of the diaphragm 21 which coincides with the focal plane of the objectives 18 and 24. To the two interference-curve systems are respectively co-ordinated the slots 19 and 20. Due to properly chosen thickness of the aluminium layer 8, the two interference-curve systems—Haidinger rings in the embodiment FIG. 1—are displaced an amount $\varphi/2$ relatively to each other.

Directly in the rear of the slots 19 and 20 are disposed respectively photoelectric receivers 25 and 26, which are connected to pairs of deviating plates 27, 28 and 29, 30 in a cathode-ray tube 31. The cathode-ray tube 31 contains a sector disc 33 which is fixed in the vicinity of the screen 32 and by means of an amplifier 34 is connected to the analyzer 16.

Displacement of the prism 10 relative to the scale 13 causes the interference-curve systems to travel in the plane of the diaphragm 21. Bright and dark interference curves appear alternately in the slots 19 and 20. The photoelectric receivers 25 and 26 are struck by alternating brightnesses and react by imparting corresponding current pulses to the pairs of deviating plates 27, 28 and 29, 30. This means that the electron beam produced in the cathode-ray tube 31 effects a rotary motion in the form of a cone and alternately sweeps over a sector and an interspace of the disc 33. Each sector when being swept over, produces a pulse which by way of the amplifier 34 proceeds to the analyzer 16.

In the analyzer 16, the pulses which emanate from the photoelectric microscope 12 and are due to the division lines 14 on the scale 13 are counted in the same manner as are the fractions of a division interval due to the interference curves and the sector disc 33, these fractions depending on fractions of the wave length of the light used. The result of the count is either stored or indicated. Instead of the semi-transparent plate 9, two beam-dividing means (not shown) can be used, the one of which divides the beam 2 into a measuring beam 2' and a comparison beam 2", and the other of which divides into halves the measuring beam deflected by the prism 10 and the comparison beam deflected by the prism 11 and in each case combines for interference part of the measuring beam and part of the comparison beam.

In the embodiment FIG. 2 the sector disc 33 is outside the cathode-ray tube 31. The screen 32 has a fluorescent layer of very short dying-out time. Rotary motion of the electron ray causes a spot of light to travel on the screen 32. Light pulses depending on the sector disc 33 and the speed of the rotary motion of the electron ray are taken up by a photoelectric receiver 35, which transforms them into current pulses, amplifies and directs them to the analyzer 16. In all other respects the embodiment FIG. 2 is assumed to be equal to the embodiment FIG. 1.

The invention is not restricted to the above-described two embodiments and need not necessarily rely on the Michelson principle, nor on the arrangement of the optical elements shown in the drawing. In particular, the triple prisms 10 and 11 can be replaced by mirrors or right-angled prisms, and the phase shifting of the two interference curves relative to each other can be effected by optical means other than an aluminum layer 8, for example by a suitable compensator. The sectors of the slotted disc can be electrically insulated from each other, which may sometimes be of particular practical importance.

I claim:

1. An apparatus for measuring lengths comprising an interferometer having a beam-dividing means for dividing the beam from a light source into a measuring beam and a comparison beam, a first reflector displaceable along the axial ray of said measuring beam, a second reflector stationary in said comparison beam, a first optical means for dividing into two partial beams the measuring beam after reflection on said first reflector and for dividing into two partial beams the comparison beam after reflection on said second reflector, each partial beam of the measuring beam being combined and interfered with one of the partial beams of the comparison beam, a second optical means imparting to the one of the combined beams a phase-displacement relative to the other, two objectives respectively disposed in the two combined beams and producing two interference images, a diaphragm aperture in the image plane of each of said objectives, and a photoelectric receiver in the rear of each diaphragm aperture, said photoelectric receiver transforming into electric pulses the light pulses of the traveling interference image which traverse said diaphragm aperture when said first reflector is being displaced, and further comprising a photoelectric microscope fast with said first reflector, a stationary divided scale below said microscope and parallel to said axial ray, said scale producing electric pulses in said microscope when said first reflector is being displaced, a first amplifier electrically connected to said microscope, an analyzer electrically connected to said first amplifier, means producing an electron ray, two pairs of deviating plates for said electron ray lying cross-wise on one another at the angle of said phase displacement, said pairs of deviating plates being electrically connected to one of said photoelectric receivers respectively and being electrically excited by the pulses produced in said photoelectric receivers and causing said electron ray to rotate, a stationary slotted disc of electrically conductive material for receiving said electron ray, and a second amplifier electrically connected to said slotted disc and to said analyzer, said analyzer analyzing the electric pulses emanating from said microscope and from said slotted disc.

2. An apparatus for measuring lengths comprising an interferometer having a first reflector, a second reflector, a beam-dividing means for dividing the beam from a light source into a measuring beam for reflection on said first reflector and a comparison beam for reflection on said second reflector and for dividing into two partial beams the measuring beam after reflection on said first reflector and for dividing into two partial beams the comparison beam after reflection on said second reflector, each partial beam of the measuring beam being combined and interfered with one of the partial beams of the comparison beam, said first reflector being displaceable parallel to the axial ray of said measuring beam, an optical means imparting to the one of the combined beams a phase-displacement relative to the other, two objectives respectively disposed in the two combined beams and producing two interference images, a diaphragm aperture in the image plane of each of said objectives, and a photoelectric receiver in the rear of each diaphragm aperture, said photoelectric receiver transforming into electric pulses the light pulses of the traveling interference image which traverse said diaphragm aperture when said first reflector is being displaced, and further comprising a photoelectric microscope fast with said first reflector, a stationary divided scale below said microscope and parallel to said axial ray, said scale producing electric pulses in said microscope when said first reflector is being displaced, a first amplifier electrically connected to said microscope, an analyzer electrically connected to said first amplifier, means producing an electron ray, two pairs of deviating plates for said electron ray lying cross-wise on one another at the angle of said phase-displacement, said pairs of deviating plates being electrically connected to one of said photoelectric receivers respectively and being electrically excited by the pulses produced in said photoelectric receivers and causing said electron ray to rotate, a stationary slotted disc of electrically conductive material for receiving said electron ray, and a second amplifier electrically connected to said slotted disc and electrically connected to said analyzer, said analyzer analyzing the electric pulses emanating from said microscope and from said slotted disc.

3. An apparatus for measuring lengths comprising an interferometer having a beam-dividing means for dividing the beam from a light source into a measuring beam and a comparison beam, a first reflector displaceable along the axial ray of said measuring beam, a second reflector stationary in said comparison beam, a first optical means for dividing into two partial beams the measuring beam after reflection on said first reflector and for dividing into two partial beams the comparison beam after reflection on said second reflector, each partial beam of the measuring beam being combined and interfered with one of the partial beams of the comparison beam, a second optical means imparting to the one of the combined beams a phase-displacement relative to the other, two objectives respectively disposed in the two combined beams and producing two interference images, a diaphragm aperture in the image plane of each of said objectives, and a photoelectric receiver in the rear of each diaphragm aperture, said photoelectric receiver transforming into electric pulses the light pulses of the traveling interference image which traverse said diaphragm aperture when said first reflector is being displaced, and further comprising a photoelectric microscope fast with said first reflector, a stationary divided scale below said microscope and parallel to said axial ray, said scale producing electric pulses in said microscope when said first reflector is being displaced, a first amplifier electrically connected to said microscope, an analyzer electrically connected to said first amplifier, means producing an electron ray, two pairs of deviating plates for said electron ray lying cross-wise on one another at the angle of said phase displacement, said pairs of deviating plates being electrically connected to one of said photoelectric receivers respectively and being electrically excited by the pulses produced in said photoelectric receivers and causing said electron ray to rotate, a slotted disc for interrupting said electron ray, a screen for intercepting said electron ray, said slotted disc being stationary and disposed near said screen, a third photoelectric receiver disposed in the rear of said screen and said slotted disc and transforming into electric pulses the light pulses which said electron ray produces on said screen, a second amplifier electrically connected to said third photoelectric receiver and to said analyzer, said analyzer analyzing the electric pulses emanating from said microscope and from said third photoelectric receiver.

4. An apparatus for measuring lengths comprising an interferometer having a first reflector, a second reflector, a beam-dividing means for dividing the beam from a light source into a measuring beam for reflection on said first reflector and a comparison beam for reflection on said second reflector and for dividing into two partial beams the measuring beam after reflection on said first reflector and for dividing into two partial beams the comparison beam after reflection on said second reflector, each partial beam of the measuring beam being combined and interfered with one of the partial beams of the comparison beam, said first reflector being displaceable parallel to the axial ray of said measuring beam, an optical means imparting to the one of the combined beams a phase-displacement relative to the other, two objectives respectively disposed in the two combined beams and producing two interference images, a diaphragm aperture in the image plane of each of said objectives, and a photoelectric receiver in the rear of each diaphragm aperture, said photoelectric receiver transforming into electric pulses the light pulses of the traveling interference image which traverse said diaphragm aperture when said first reflector is being displaced, and further comprising a photoelectric microscope fast with said first reflector, a stationary divided scale below said microscope and parallel to said axial ray, said scale producing electric pulses in said microscope when said first reflector is being displaced, a first amplifier electrically connected to said microscope, an analyzer electrically connected to said first amplifier, means producing an electron ray, two pairs of deviating plates for said electron ray lying crosswise on one another at the angle of said phase-displacement, said pairs of deviating plates being electrically connected to one of said photoelectric receivers respectively and being electrically excited by the pulses produced in said photoelectric receivers and causing said electron ray to rotate, a slotted disc for interrupting said electron ray, a screen for intercepting said electron ray, said slotted disc being stationary and disposed near said screen, a third photoelectric receiver disposed in the rear of said screen and said slotted disc and transforming into electric pulses the light pulses which said electron ray produces on said screen, a second amplifier electrically connected to said third photoelectric receiver and to said analyzer, said analyzer analyzing the electric pulses emanating from said microscope and from said third photoelectric receiver.

References Cited
UNITED STATES PATENTS 2,977,841    4/1961    Kaufmann et al. _____ 88—14

ROBERT SEGAL, *Primary Examiner.*